(12) United States Patent
Nakano (10) Patent No.: US 8,695,657 B2
(45) Date of Patent: Apr. 15, 2014

(54) PNEUMATIC TIRE

(75) Inventor: Tomoya Nakano, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1119 days.

(21) Appl. No.: 12/449,567

(22) PCT Filed: Feb. 25, 2008

(86) PCT No.: PCT/JP2008/053175
§ 371 (c)(1),
(2), (4) Date: Aug. 13, 2009

(87) PCT Pub. No.: WO2008/105363
PCT Pub. Date: Sep. 4, 2008

(65) Prior Publication Data
US 2011/0180189 A1     Jul. 28, 2011

(30) Foreign Application Priority Data
Feb. 26, 2007   (JP) ................... 2007-046103

(51) Int. Cl.
*B60C 11/03*   (2006.01)

(52) U.S. Cl.
USPC ............ 152/209.18; 152/209.21; 152/209.24; 152/209.27

(58) Field of Classification Search
USPC ............. 152/209.1, 209.18, 209.21, 209.24, 152/209.27
See application file for complete search history.

(56) References Cited

U.S. PATENT DOCUMENTS

| | | | | |
|---|---|---|---|---|
| 4,223,712 A | * | 9/1980 | Iwata et al. | 152/209.22 |
| 4,320,790 A | * | 3/1982 | Corner et al. | 152/209.27 |
| 4,603,721 A | | 8/1986 | Kogure et al. | |
| 5,535,798 A | * | 7/1996 | Nakamura | 152/209.21 |
| 5,772,807 A | | 6/1998 | Fourgon | |
| 6,578,612 B1 | | 6/2003 | Matsumura | |
| 2002/0092591 A1 | * | 7/2002 | Cortes | 152/209.18 |

FOREIGN PATENT DOCUMENTS

| | | |
|---|---|---|
| DE | 199 62 165 A1 | 8/2000 |
| EP | 586124 A1 * | 3/1994 |
| EP | 0 829 380 A2 | 3/1998 |
| JP | 58-199204 | 11/1983 |

(Continued)

OTHER PUBLICATIONS

Machine translation for Japan 2005-193702 (no date).*

*Primary Examiner* — Steven D Maki (74) *Attorney, Agent, or Firm* — Carrier Blackman & Associates, P.C.; Joseph P. Carrier; William D. Blackman (57) ABSTRACT

A pneumatic tire includes a tread portion; three or more circumferential direction grooves; width direction grooves; and lines of land portions. When a tread center area and tread shoulder areas are sectioned at centerlines of the circumferential direction grooves in outermost sides in the tire width direction, a ratio G=(A+B)/X of a sum A+B of a groove area A of the circumferential direction grooves and a groove area B of the width direction grooves to a contact area X of the tread portion is in a range of G≤0.25, a ratio S=B/(A+B) of the groove area B to the sum A+B is in a range of 0.25<S<0.45, a ratio Gs=C/Y of a groove area C of the tread shoulder areas to a contact area Y of the tread shoulder areas is in a range of Gs<0.20, and the ratio G and the ratio Gs have a relation of Gs<G.

9 Claims, 4 Drawing Sheets

(56) References Cited

FOREIGN PATENT DOCUMENTS

| JP | 03-125609 | 5/1991 |
| JP | 03-271003 | 12/1991 |
| JP | 08-156528 | 6/1996 |
| JP | 08-244413 | 9/1996 |
| JP | 11-245628 | 9/1999 |
| JP | 2003-072319 A | 3/2003 |
| JP | 2003-154813 | 5/2003 |
| JP | 2005-193702 A * | 7/2005 |
| JP | 2007-131106 | 5/2007 |
| WO | WO 2007/055065 A1 | 5/2007 |

* cited by examiner

| | CONVENTIONAL EXAMPLE 1 (RIB) | CONVENTIONAL EXAMPLE 2 (TRACTION) | INVENTION EXAMPLE 1 | INVENTION EXAMPLE 2 | INVENTION EXAMPLE 3 | COMPARATIVE EXAMPLE |
|---|---|---|---|---|---|---|
| NUMBER OF CIRCUMFERENTIAL DIRECTION MAIN GROOVES | 4 | 3 | 4 | 5 | 5 | 5 |
| GROOVE AREA RATIO G | 0.28 | 0.30 | 0.20 | 0.20 | 0.20 | 0.20 |
| WIDTH DIRECTION GROOVE RATIO S | 0.17 | 0.5 | 0.4 | 0.4 | 0.4 | 0.2 |
| GROOVE AREA RATIO Gs | 0.18 | 0.25 | 0.18 | 0.18 | 0.18 | 0.18 |
| GROOVE WALL ANGLE θ | 12° | 8° | 6° | 6° | 12° | 12° |
| (h2/h1)/(w2/w1) | 0.20/0.10 | 0.50/0.30 | 0.40/0.30 | 0.40/0.30 | 0.40/0.30 | 0.40/0.30 |
| RUBBER THICKNESS t [mm] | 5.0 | 6.0 | 4.5 | 4.5 | 4.5 | 4.5 |
| Tan δ | 0.15 | 0.15 | 0.10 | 0.10 | 0.10 | 0.10 |
| ROLLING RESISTANCE | 100 | 80 | 105 | 110 | 115 | 105 |
| SNOW BRAKING PERFORMANCE | 80 | 100 | 100 | 100 | 100 | 80 |
| WET PERFORMANCE | 90 | 100 | 100 | 100 | 100 | 80 |
| UNEVEN WEAR RESISTANCE | 100 | 90 | 100 | 100 | 100 | 100 |

PNEUMATIC TIRE

CROSS-REFERENCE TO RELATED APPLICATIONS

The present application is a U.S. National phase of, and claims priority based on PCT/JP2008/053175 filed 25 Feb. 2008, which, in turn, claims priority from Japanese patent application 2007-046103, filed 26 Feb. 2007. The entire disclosure of each of the referenced priority documents is incorporated herein by reference.

TECHNICAL FIELD

The present invention relates to a pneumatic tire. More specifically, the present invention relates to a pneumatic tire whose rolling resistance can be reduced while the snow traction performance of the tire is maintained.

BACKGROUND ART

In a pneumatic tire that has a traction pattern, width direction grooves are arranged in a tread center area and tread shoulder areas to ensure the snow traction performance. However, the traction pattern easily deteriorates the low rolling resistance of the tire. The above configuration has an objective to improve the low rolling resistance while the snow traction performance of the tire is maintained.

As a conventional pneumatic tire with the above objective, the technology disclosed in Patent Document 1 is known. In the conventional pneumatic tire (heavy load radial tire), four longitudinal main grooves that continuously extend in a circumferential direction and have a groove width not less than 3.0 mm and not more than 19.0 mm and lateral grooves that intersect with the longitudinal grooves are provided on a tread surface, so that the tread surface is sectioned into a center block line consisting of blocks arranged in the circumferential direction on a tire equator; a pair of shoulder block lines consisting of blocks arranged in the circumferential direction along a tread edge; and a pair of middle block lines consisting of blocks arranged in the circumferential direction between the center block line and the shoulder block lines. The pneumatic tire has the following characteristics. The longitudinal main grooves include two or more longitudinal main grooves each having a groove width equal to or larger than 7.0 mm. A distance L from the center of the longitudinal main groove on an outer side in a tire axial direction to the tire equator is 0.25 to 0.35 of a width TW of a contact area by which the tread surface contacts with the ground in a normal state where the tire is mounted on a standard rim, filled with a standard internal force, and applied with a standard load. The lateral grooves that form the middle block lines are arc-shaped lateral grooves that have arc centers in the middle block lines and curve. A ratio S1/S of a total S1 of an area of the longitudinal main grooves and the lateral grooves to an area S of the contact area is 0.26 to 0.34. A lateral edge density E that is a ratio A/S of a total length A of lateral edge components of an edge portion formed by each edge of the longitudinal grooves and the lateral grooves, which are provided in the contact area, to the area S of the contact area is 0.025 to 0.035 (unit: $mm/mm^2$). A lateral edge density ratio Es/Ec of a lateral edge density Ec of a center contact area of the contact area between the centers of the longitudinal main grooves on the outer side to a lateral edge density Es of outer contact areas of the contact area on outer sides of the center contact area is 0.60 to 0.85.

Patent Document 1: Japanese Patent Application Laid-open No. H11-245628

DISCLOSURE OF INVENTION

Problem to be Solved by the Invention

An object of the present invention is to provide a pneumatic tire whose rolling resistance can be reduced while the snow traction performance of the tire is maintained.

Means for Solving Problem

A pneumatic tire according to an aspect of the present invention includes a tread portion; three or more circumferential direction main grooves that extend in a tire circumferential direction on the thread portion; a plurality of width direction grooves that extend in a tire width direction on the thread portion; and a plurality of lines of land portions that are sectioned by the circumferential direction main grooves and the width direction grooves on the thread portion. The tread portion has a traction pattern formed by the circumferential direction main grooves, the width direction grooves, and the land portions. When a tread center area and tread shoulder areas are sectioned at centerlines of the circumferential direction main grooves in outermost sides in the tire width direction, a ratio $G=(A+B)/X$ of a sum $A+B$ of a groove area A of the circumferential direction main grooves and a groove area B of the width direction grooves to a contact area X of the tread portion is in a range of $G \leq 0.25$, a ratio $S=B/(A+B)$ of the groove area B of the width direction grooves to the sum $A+B$ of the groove area A of the circumferential direction main grooves and the groove area B of the width direction grooves is in a range of $0.25 < S < 0.45$, a ratio $Gs=C/Y$ of a groove area C of the tread shoulder areas to a contact area Y of the tread shoulder areas is in a range of $Gs < 0.20$, and the ratio G and the ratio Gs have a relation of $Gs < G$.

In the pneumatic tire, because the ratio $G=(A+B)/X$ of the sum $A+B$ of the groove area A of the circumferential direction main grooves and the groove area B of the width direction grooves to the contact area X of the tread portion is set to a predetermined value or smaller ($G \leq 0.25$), the rigidity of the land portions increases. This prevents the land portions from deforming when the tire contacts with the ground, which advantageously reduces the rolling resistance of the tire. The ratio $S=B/(A+B)$ of the groove area B of the width direction grooves and the sum $A+B$ of the groove area A of the circumferential direction main grooves and the groove area B of the width direction grooves is set appropriately. This advantageously maintains the snow traction performance and the rolling resistance of the tire. The ratio Gs of the groove area C of the tread shoulder areas to the contact area Y of the tread shoulder areas is set appropriately. This advantageously improves the unevenwear resistance of the tire.

In the pneumatic tire, the ratio G may be in a range of $G \geq 0.15$.

In the pneumatic tire, the lower limit of the ratio G is set appropriately, which advantageously maintains the snow and wet performance of the tire.

In the pneumatic tire, the circumferential direction main grooves may include at least five circumferential direction main grooves.

In the pneumatic tire, more circumferential direction main grooves improve drainage performance. In addition, deformation is controlled by equalizing the contact pressure between the block lines. This advantageously reduces the rolling resistance of the tire more effectively while the wet performance of the tire is maintained.

In the pneumatic tire, a groove wall angle θ of at least one of the circumferential direction main grooves may be in a range of θ≥8 [deg].

In the pneumatic tire, the range of the groove wall angle θ is set appropriately, which advantageously reduces the rolling resistance of the tire.

In the pneumatic tire, the groove wall angle θ of the circumferential direction main groove may vary in the tire circumferential direction.

In the pneumatic tire, because the groove wall angle θ varies, the rigidity of the land portions increases. This prevents the land portions from falling over, which advantageously reduces the rolling resistance of the tire.

In the pneumatic tire, a groove depth h1 of the circumferential direction main grooves and a groove depth h2 of the width direction grooves may have a relation of h2/h1≥0.30, and a groove width w1 of the circumferential direction main grooves and a groove width w2 of the width direction grooves may have a relation of w2/w1≥0.20.

In the pneumatic tire, the size ratios h2/h1, w2/w1 of the width direction grooves to the circumferential direction main grooves are defined, which appropriately ensures a groove volume of the width direction grooves. This advantageously improves the snow traction performance of the tire.

In the pneumatic tire, the groove depth h1 of the circumferential direction main grooves and the groove depth h2 of the width direction grooves may have a relation of h2/h1≤0.70, and the groove width w1 of the circumferential direction main grooves and a groove width w2 of the width direction grooves may have a relation of w2/w1≤0.50.

In the pneumatic tire, a groove volume of the width direction grooves is ensured, which advantageously improves the snow traction performance of the tire.

In the pneumatic tire, when a belt reinforcing layer is arranged in the tread portion, a thickness t of a tread rubber from a groove bottom of the circumferential direction main groove in the tread center area to the belt reinforcing layer may be in a range of 3.0 [mm]≤t≤5.5 [mm].

In the pneumatic tire, the thickness t of the tread rubber from the groove bottom of the circumferential direction main groove to the belt reinforcing layer is set appropriately, which advantageously reduces the rolling resistance of the tire effectively.

In the pneumatic tire, a tan δ of a tread rubber that may be obtained when the tread rubber is heated at 100[° C.] is in a range of 0.01≤tan δ≤0.07.

In the pneumatic tire, the tan δ of the tread rubber is set appropriately, which advantageously reduces the rolling resistance of the tire effectively.

In the pneumatic tire, the pneumatic tire may be applied to a heavy load pneumatic radial tire.

In the heavy load pneumatic radial tire, the tire rolling resistance tends to increase easily. Therefore, by applying the pneumatic tire, the effect of reducing the rolling resistance can be advantageously obtained more remarkably.

Effect of the Invention

In the pneumatic tire according to the invention, because a ratio G=(A+B)/X of the sum A+B of the groove area A of the circumferential direction main grooves and the groove area B of the width direction grooves to the contact area X of the tread portion is set to a predetermined value or smaller (G≤0.25), which increases the rigidity of the land portions. This reduces deformation of the land portions when the tire contacts with the ground, which advantageously reduces the rolling resistance of the tire. The ratio S=B/(A+B) of the groove area B of the width direction grooves and the sum A+B of the groove area A of the circumferential direction main grooves and the groove area B of the width direction grooves is set appropriately. This advantageously maintains the snow traction performance and the rolling resistance of the tire. The ratio Gs=C/Y of the groove area C of the tread shoulder areas and the contact area Y of the tread shoulder areas is set appropriately. This advantageously improves the unevenwear resistance of the tire.

EXPLANATIONS OF LETTERS OR NUMERALS

1 Pneumatic tire
3 Width direction groove
4 Center land portion
5 Shoulder land portion
6 Belt reinforcing layer
21, 22 Circumferential direction main groove

BEST MODE(S) FOR CARRYING OUT THE INVENTION

Detailed descriptions about the present invention are provided below with reference to the accompanying drawings. The embodiment does not limit the invention. The elements of the embodiment include those that can be easily replaced by those skilled in the art and those substantially same as those of the embodiment. The modifications described in the embodiment can be arbitrarily combined within the scope obvious to those skilled in the art.

EMBODIMENT

Figure 1:
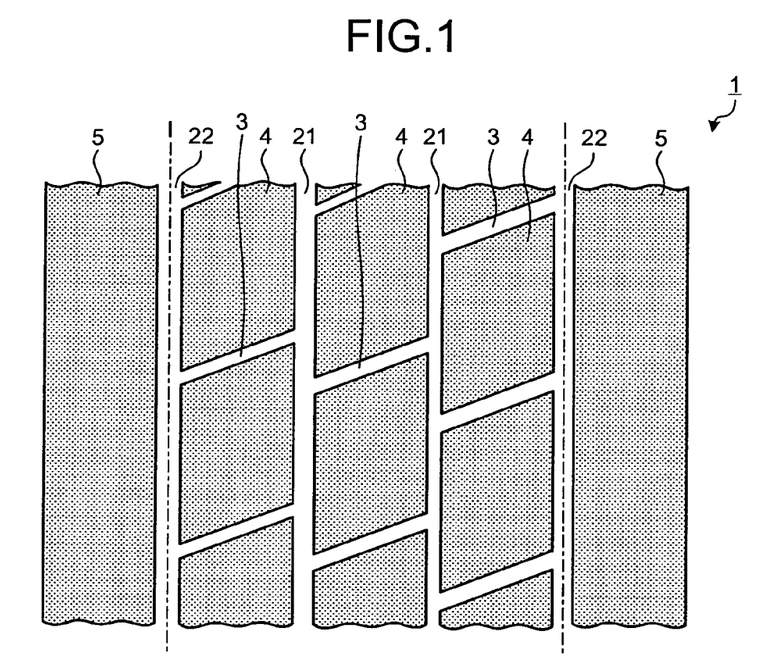
FIG. 1 is a top view of a tread of a pneumatic tire according to an embodiment of the present invention.

FIG. 1 is a top view of a tread of a pneumatic tire according to an embodiment of the present invention. FIGS. 2 to 6 are explanatory views of modifications of the pneumatic tire shown in FIG. 1. FIG. 7 is a table of results of performance tests of pneumatic tires according to the embodiment of the present invention.

In a pneumatic tire 1, a traction pattern is formed in a tread portion by three or more circumferential direction main grooves 21, 22 that extend in a tire circumferential direction; a plurality of width direction grooves 3 that extend in a tire width direction; and a plurality of lines of land portions 4, 5 that are sectioned by the circumferential direction main grooves 21, 22 and the width direction grooves 3. At centerlines 1 of the circumferential direction main grooves 22 on the outermost sides in the tire width direction, which serve as borders, the tread portion is sectioned into a tread center area and tread shoulder areas. The tread shoulder areas are the areas from the centerlines 1 of the circumferential direction main grooves 22 to edges of a contact surface of the tire.

For example, in the embodiment, the four circumferential direction main grooves 21, 22 are provided. On the tread center area, three lines of center land portions 4 are formed. On each of the tread shoulder areas on the left and right, one line of a shoulder land portion 5 is formed. The plurality of width direction grooves 3 are arranged in each of the center land portions 4 and, the width direction grooves 3 are open to the circumferential direction main grooves 21, 22 adjacent to the width direction grooves 3, so that three block lines (the center land portions 4) are formed. In the embodiment, three block lines are formed in the tread center area. However, block lines are not limited to this as long as at least one block line is formed in the entire tread portion.

In the pneumatic tire 1, a groove area with respect to a contact area is defined as follows. First, a ratio $G=(A+B)/X$ of a sum $A+B$ of a groove area A of the circumferential direction main grooves 21, 22 and a groove area B of the width direction grooves 3 to a contact area X of the tread portion is set to $G \leq 0.25$. A ratio $S=B/(A+B)$ of the groove area B of the width direction grooves 3 to the sum $A+B$ of the groove area A of the circumferential direction main grooves 21, 22 and the groove area B of the width direction grooves 3 is set to $0.25<S<0.45$. A ratio $Gs=C/Y$ of a groove area C of the tread shoulder areas to a contact area Y of the tread shoulder areas is set to $Gs<0.20$ (preferably, $0.05<Gs<0.20$). The ratio G and the ratio Gs has the relation of $Gs<G$.

The groove area C of the tread shoulder areas includes a groove area of a part of the groove area of the circumferential direction main grooves 22 on the side of the tread shoulder areas from the centerlines 1. In the embodiment, the width direction grooves 3 are formed in only the center land portions 4. If the width direction grooves 3 are formed in the shoulder land portions 5, the groove area of the width direction grooves 3 is included in the groove are C of the tread shoulder areas.

The contact surface of the tire is the area on which the tire and a plate contacts with each other when the tire is mounted on an applicable rim, applied with a regular internal pressure without load, and placed perpendicular to the plate in a still state. Based on the contact surface of the tire, the contact areas X, Y of the tire X: the contact area of the tread portion, Y: the contact area of the tread shoulder areas) and the groove areas A to C are defined.

The applicable rim is "Applicable Rim" defined by JATMA, "Design Rim" defined ETRTO, or "Measuring Rim" defined ETRTO. The regular internal pressure is "MAXIMUM AIR PRESSURE" defined by JATMA, the maximum value of "TIRE LOAD LIMITS AT VARIOUS COLD INFLATION PRESSURES" defined by TRA, or "INFLATION PRESSURES" defined by ETRTO. A regular load is "MAXIMUM LOAD CAPACITY" defined by JATMA, the maximum value of "TIRE LOAD LIMITS AT VARIOUS COLD INFLATION PRESSURES" defined by TRA, or "LOAD CAPACITY" defined by ETRTO. In the case of a tire for passenger cars, the regular internal pressure is an air pressure of 180 [kPa] and the regular load is 88[%] of the maximum load capacity.

In the pneumatic tire 1, the ratio $G=(A+B)/X$ of the sum $A+B$ of the groove area A of the circumferential direction main grooves 21, 22 and the groove area B of the width direction grooves 3 to the contact area X of the tread portion is set to predetermined value or smaller ($G \leq 0.25$), which increases the rigidity of the land portions 4, 5. This prevents the land portions 4, 5 from deforming when the tire contacts with the ground, which advantageously reduces the rolling resistance of the tire.

In addition, the ratio $S=B/(A+B)$ of the groove area B of the width direction grooves 3 to the sum $A+B$ of the groove area A of the circumferential direction main grooves 21, 22 and the groove area B of the width direction grooves 3 is set appropriately. This advantageously maintains the snow traction performance and the rolling resistance of the tire. For example, if $S \leq 0.25$, the snow traction performance deteriorates. If $0.45 \leq S$, the rolling resistance of the tire deteriorates.

The ratio Gs of the groove area C of the tread shoulder areas and the contact area Y of the tread shoulder areas is set appropriately. This improves the uneven wear resistance of the tire. For example, if $Gs \geq 0.20$, the uneven wear resistance of the tire deteriorates.

Because the relation between the ratio G and the ratio Gs is set appropriately, the contact pressure on the contact surface can be equalized, which advantageously improves the uneven wear resistance. If $Gs>G$, deformation of the shoulder portion increases and the rolling resistance deteriorates. In addition, uneven wear such as heel-and-toe wear occurs easily.

[Additional Note 1]

In the pneumatic tire 1, it is preferable that the ratio $G=(A+B)/X$ of the sum $A+B$ of the groove area A of the circumferential direction main grooves 21, 22 and the groove area B of the width direction grooves 3 to the contact area X of the tread portion be in the range of $G \geq 0.15$. In this configuration, the lower limit of the ratio G is set appropriately, which advantageously maintains the snow and wet performance of the tire.

[Additional Note 2]

Figure 2:
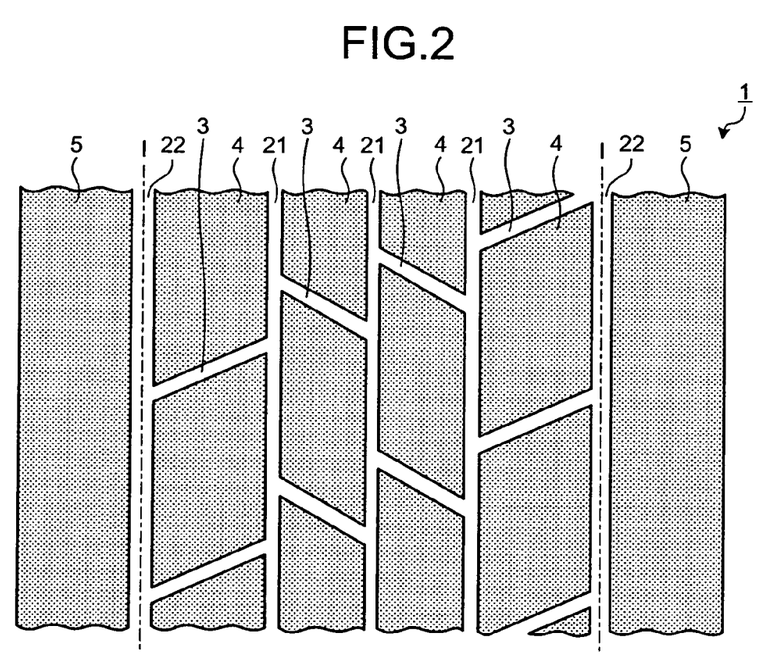
FIG. 2 is an explanatory view of a modification of the pneumatic tire shown in FIG. 1.

In the pneumatic tire, it is preferable that five or more circumferential direction main grooves 21, 22 be arranged (see FIG. 2). In this configuration, more circumferential direction main grooves improve drainage performance. In addition, deformation is controlled by equalizing the contact pressure between the block lines. This advantageously reduces the rolling resistance of the tire more effectively while the wet performance of the tire is maintained.

For example, in this embodiment, the five circumferential direction main grooves 21, 22 are formed in the tread portion. The four lines of center land portions 4 and the left and right lines of shoulder land portions 5 are sectioned by the circumferential direction main grooves 21, 22. The width direction grooves 3 are formed in each of the center land portions 4 and four block lines are formed in the tread center area. The width direction groove 3 is not provided in each of the shoulder land portions 5.

[Additional Note 3]

Figure 3:
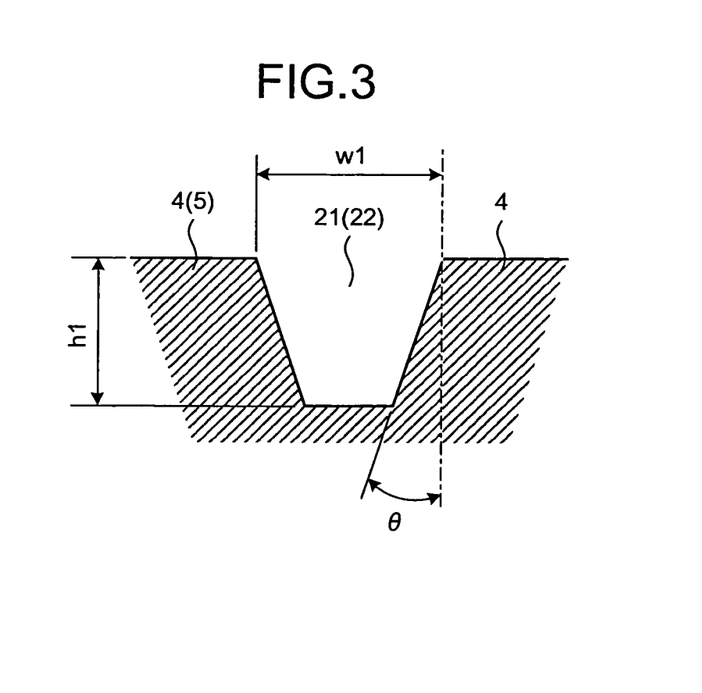
FIG. 3 is an explanatory view of a modification of the pneumatic tire shown in FIG. 1.

In the pneumatic tire 1, it is preferable that a groove wall angle θ of at least one of the circumferential direction main grooves 21, 22 is in the range of $θ \geq 8$ [deg] (see, FIG. 3). In this configuration, the range of the groove wall angle θ is set appropriately, which advantageously reduces the rolling resistance of the tire. For example, if $θ<8$ [deg], when deformation of the tread portion increases while the tire rotates, the blocks (land portions 4) fall over and the rolling resistance of the tire increases. Therefore, by achieving a trapezoidal shape of the cross section of the block to satisfy $θ \geq 8$ [deg] (preferably, $35 [deg] \geq θ \geq 8 [deg]$), the falling-over of the blocks is reduced, so that the rolling resistance of the tire decreases. The groove wall angle θ is defined by an oblique angle formed by the perpendicular with respect to contact surface of the land portion 4, 5 and the groove wall surface of the circumferential direction main groove 21, 22 in the cross sectional view in a groove depth direction of the circumferential direction main groove 21, 22.

[Additional Note 4]

Figure 4:
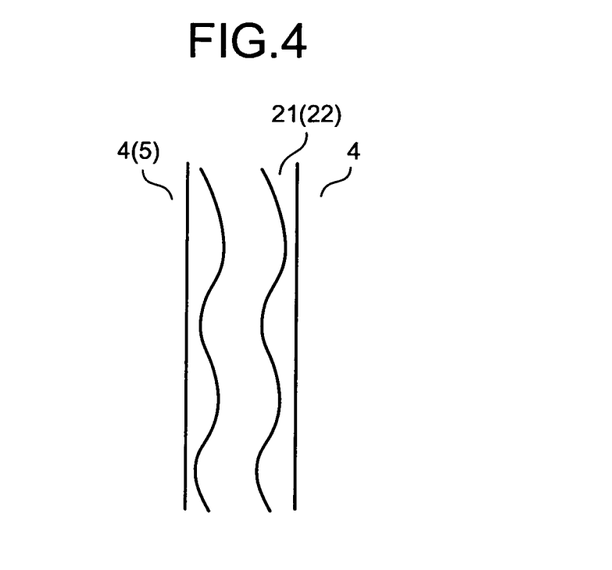
FIG. 4 is an explanatory view of a modification of the pneumatic tire shown in FIG. 1.

In the pneumatic tire 1, it is preferable that the groove wall angle θ of the circumferential direction main grooves 21, 22 vary in the tire circumferential direction (see FIG. 4). For example, in the embodiment, in the top view of the tread portion, the groove wall angle θ varies such that a wave shape or a zig-zag shape is formed in the tire circumferential direction. In this configuration, because the groove wall angle θ varies, the rigidity of the land portions 4, 5 increases. This reduces the falling-over of the land portions 4, 5, which advantageously reduces the rolling resistance of the tire.

[Additional Note 5]

Figure 5:
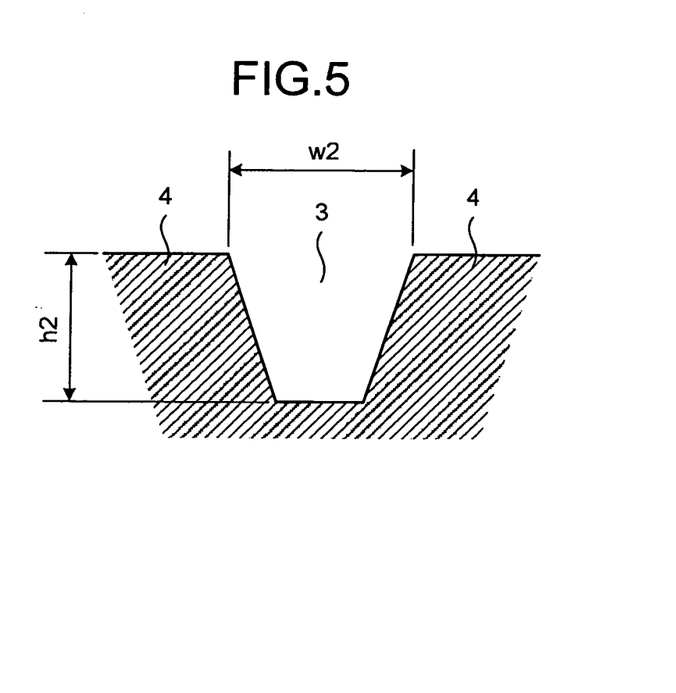
FIG. 5 is an explanatory view of a modification of the pneumatic tire shown in FIG. 1.

In the pneumatic tire 1, it is preferable that a groove depth h1 of the circumferential direction main grooves 21, 22 and a groove depth h2 of the width direction grooves 3 have the relation of h2/h1≥0.30 and a groove width w1 of the circumferential direction main grooves 21, 22 and a groove width w2 of the width direction grooves 3 have the relation of w2/w1≥0.20 (see FIGS. 3 and 5). In this configuration, the size ratios h2/h1, w2/w1 of the width direction grooves 3 to the circumferential direction main grooves 21, 22 are defined, which appropriately ensures a groove volume of the width direction grooves 3. This advantageously improves the snow traction performance of the tire.

In the above configuration, it is preferable that the groove depth h1 of the circumferential direction main grooves 21, 22 and the groove depth h2 of the width direction grooves 3 have the relation of h2/h1≤0.70 and the groove width w1 of the circumferential direction main grooves 21, 22 and the groove width w2 of the width direction grooves 3 have the relation of w2/w1≤0.50 (see FIGS. 3 and 5). This appropriately ensures the groove volume of the width direction grooves 3, which advantageously improves the snow traction performance of the tire.

[Additional Note 6]

Figure 6:
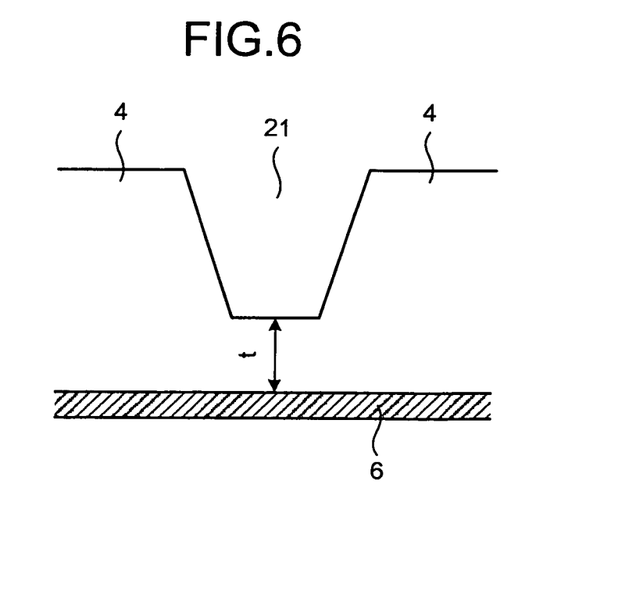
FIG. 6 is an explanatory view of a modification of the pneumatic tire shown in FIG. 1.
Figure 7:
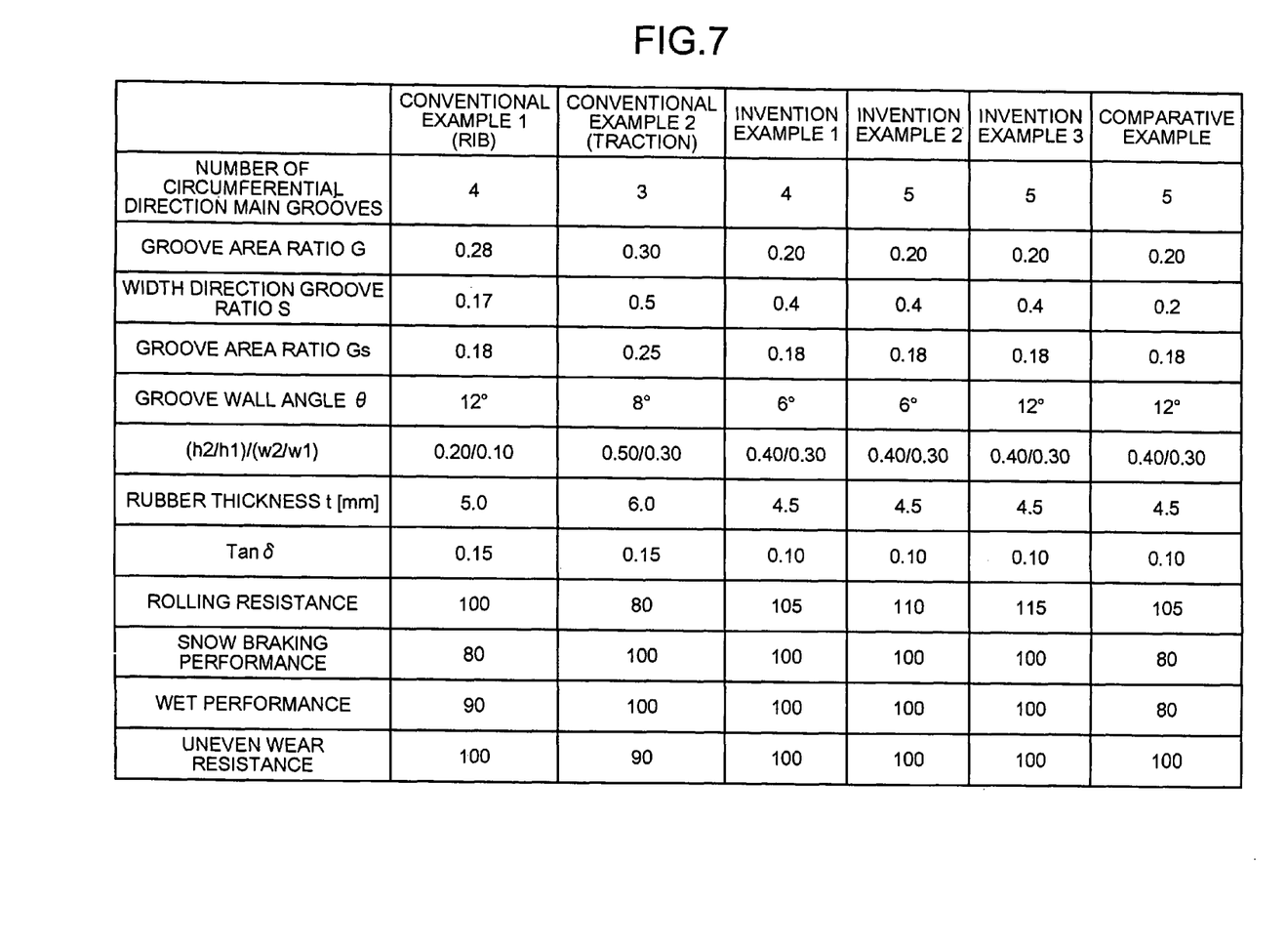
FIG. 7 is a table of results of performance tests on pneumatic tires according to the embodiment of the present invention.

In the pneumatic tire 1, it is preferable that, when a belt reinforcing layer 6 is arranged in the tread portion, a thickness t of a tread rubber from the groove bottom of the circumferential direction main groove 21 in the tread center area to the belt reinforcing layer 6 be in the range of 3.0 [mm]≤t≤5.5 [mm] (see FIG. 6). In this configuration, the thickness t of the tread rubber from the groove bottom of the circumferential direction main groove 21 to the belt reinforcing layer 6 is set appropriately, which advantageously reduces the rolling resistance of the tire effectively. For example, if 5.5 [mm]<t, deformation of the tread rubber increases when the tire contacts with the ground, so that the blocks (land portions) fall over, which increases the tire rolling resistance. If t<3.0 [mm], outer damage due to, for example, stone drilling reaches the belt reinforcing layer easily. This can easily cause failure and cracks.

[Additional Note 7]

In addition, in the pneumatic tire 1, it is preferable that a tan δ of the read rubber that is obtained when the tread rubber is heated at 100° C. be in the range of 0.01≤tan δ≤0.07. In this configuration, because the tan δ of the tread rubber is set appropriately, the rolling resistance of the tire is advantageously reduced effectively. For example, if 0.07<tan δ, the amount of heat generated by the tread rubber while the tire is rotating increases, which increases the tire rolling resistance. If tan δ<0.01, the productivity of tire lowers.

[Application Target]

It is preferable that the pneumatic tire 1 be applied to heavy load pneumatic radial tires. In the pneumatic tire, the rolling resistance of the tire tends to increase easily. By applying the pneumatic tire, the effect of reducing the rolling resistance can be advantageously obtained more remarkably.

[Performance Test]

In this example, a plurality of pneumatic tires under different conditions underwent performance tests on (1) rolling resistance, (2) snow braking performance, (3) wet performance, (4) uneven wear resistance (see FIG. 7). In each performance test, a pneumatic tires in a tire size of 275/80R22.5 is mounted on an applicable rim, which is defined by JATMA, and applied with a regular inner pressure.

(1) In the performance test on rolling resistance, a pneumatic tire is applied with a load of 30.89 [kN] and rolling resistance is measured, using a drum rolling resistance test machine. Based on the result of the measurement, index evaluation is carried out. The evaluation is represented by an index value based on a reference (100) of a conventional pneumatic tire (Conventional Example 1). The larger the index value is, the more the rolling resistance preferably tends to decrease.

(2) In the performance test on snow braking performance, a pneumatic tire is mounted on a heavy load vehicle whose total weight is 25 [t](6×2), and the braking distance from the traveling rate of 40 [km/h] on a snow road surface is evaluated. The evaluation is represented by an index value based on a reference (100) of the conventional pneumatic tire (Conventional Example 1). The larger the index value is, the more it is preferable.

(3) In the performance test on wet performance, a pneumatic tire is mounted on a heavy load vehicle whose total weight is 25 [t] (6×2), and the braking distance from the traveling rate of 40 [km/h] on a wet road surface is evaluated. The evaluation value is represented by an index value based on a reference (100) of the conventional pneumatic tire (Conventional Example 1). The larger the index value is, the more it is preferable.

(4) In the performance test on uneven wear resistance, a pneumatic tire is mounted on a heavy load vehicle whose total weight is 25 [t](6×2) and the heavy load vehicle travels a normal pavement for 30,000 [km]. Thereafter, the degree of uneven wear is observed and evaluated. The evaluation is represented by an index value based on a reference (100) of the conventional pneumatic tire (Conventional Example 1). The larger the index value is, the more it is preferable.

The pneumatic tire of Conventional Example 1 has a rib pattern, and a conventional tire of Conventional Example 2 has a traction pattern including block lines. The pneumatic tires 1 of Invention Examples 1 to 3 each have a traction pattern that includes block lines (the land portions 4) in a tread center area. In the pneumatic tire 1, the ratio G=(A+B)/X of the sum A+B of the groove area A of the circumferential direction main grooves 21, 22 and the groove area B of the width direction grooves 3 to the contact area X of the tread portion, the ratio S=B/(A+B) of the groove area B of the width direction grooves 3 to the sum A+B of the groove area A of the circumferential direction main grooves 21, 22 and the groove area B of the width direction main grooves 3, the ratio Gs=C/Y of the groove area C of the tread shoulder areas and the contact area Y of the tread shoulder areas, and the relation between the ratio G and the ratio Gs are set appropriately (see FIG. 1).

As the test results indicate, it is found that, in the pneumatic tires 1 of Invention examples 1 to 3, the rolling resistance decreases (the index value is large) and the snow braking performance, the wet performance, and the uneven wear resistance are maintained. From the comparison between Invention Examples 1 and 2, it is found that the rolling resistance of the tire decreases in the case of the five circumferential direction main grooves 21, 22 compared with the case of the four circumferential direction main grooves 21, 22. From the comparison between Invention Examples 2 and 3, it is found that the rolling resistance of the tire is reduced by appropriately setting the groove wall angle θ of the circumferential direction main grooves 21, 22. From the comparison between Invention Example 3 and Comparative Example, it is found that the rolling resistance of the tire is reduced by appropriately setting the rate S=B/(A+B) of the groove area B of the width direction grooves 3 to the total A+B of the groove area A of the circumferential direction main grooves 21, 22 and the groove area B of the width direction main grooves 3.

INDUSTRIAL APPLICABILITY

As described above, the pneumatic tire according to the present invention is advantageous in that the rolling resistance of the tire can be reduced while maintaining the snow traction performance of the tire.

The invention claimed is:

1. A pneumatic tire comprising:
three or more circumferential direction main grooves that extend in a tire circumferential direction;
a plurality of width direction grooves that extend in a tire width direction; and
a plurality of lines of land portions that are sectioned by the circumferential direction main grooves and the width direction grooves, wherein
the tread portion has a traction pattern formed by the circumferential direction main grooves, the width direction grooves, and the land portions, wherein
when a tread center area and tread shoulder areas are sectioned at centerlines of the circumferential direction main grooves in outermost sides in the tire width direction,
a ratio G=(A+B)/X of a sum A+B of a groove area A of the circumferential direction main grooves and a groove area B of the width direction grooves to a contact area X of the tread portion is in a range of G≤0.25, a ratio S=B/(A+B) of the groove area B of the width direction grooves to the sum A+B of the groove area A of the circumferential direction main grooves and the groove area B of the width direction grooves is in a range of 0.25<S<0.45,
a ratio Gs=C/Y of a groove area C of the tread shoulder areas to a contact area Y of the tread shoulder areas is in a range of Gs<0.20, and
the ratio G and the ratio Gs have a relation of Gs<G, and
wherein a groove depth h1 of the circumferential direction main grooves and a groove depth h2 of the width direction grooves has a relation of h2/h1≥0.30, and a groove width w1 of the circumferential direction main grooves and a groove width w2 of the width direction grooves has a relation of w2/w1≥0.20.

2. The pneumatic tire according to claim 1, wherein the ratio G is in a range of G≥0.15.

3. The pneumatic tire according to claim 1, wherein the circumferential direction main grooves includes at least five circumferential direction main grooves.

4. The pneumatic tire according to claim 1, wherein a groove wall angle θ of at least one of the circumferential direction main grooves is in a range of θ≥8 deg.

5. The pneumatic tire according to claim 1, wherein a groove wall angle θ of the circumferential direction main grooves varies in the tire circumferential direction.

6. The pneumatic tire according to claim 1, wherein
the groove depth h1 of the circumferential direction main grooves and the groove depth h2 of the width direction grooves has a relation of h2/h1≤0.70, and
the groove width w1 of the circumferential direction main grooves and a groove width w2 of the width direction grooves has a relation of w2/w1≤0.50.

7. The pneumatic tire according to claim 1, wherein, when a belt reinforcing layer is arranged in the tread portion, a thickness t of a tread rubber from a groove bottom of the circumferential direction main groove in the tread center area to the belt reinforcing layer is in a range of 3.0 mm≤t≤5.5 mm.

8. The pneumatic tire according to claim 1, wherein a tan δ of a tread rubber that is obtained when the tread rubber is heated at 100° C. is in a range of 0.01≤tan δ≤0.07.

9. The pneumatic tire according to claim 1, wherein the pneumatic tire is a heavy load pneumatic radial tire.

* * * * *